United States Patent
Roessle et al.

(10) Patent No.: US 10,054,182 B2
(45) Date of Patent: Aug. 21, 2018

(54) BAFFLE TUBE FOR DAMPER WITH ELECTROMECHANICAL VALVE

(71) Applicant: Tenneco Automotive Operating Company Inc., Lake Forest, IL (US)

(72) Inventors: Matthew L. Roessle, Temperance, MI (US); Karl C. Kazmirski, Temperance, MI (US); Jeroen K. Paenhuysen, Ypsilanti, MI (US); Matthew R. Schelosky, Temperance, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 15/380,468

(22) Filed: Dec. 15, 2016

(65) Prior Publication Data
US 2018/0172105 A1    Jun. 21, 2018

(51) Int. Cl.
*F16F 9/00* (2006.01)
*F16F 9/18* (2006.01)
(Continued)

(52) U.S. Cl.
CPC .............. *F16F 9/185* (2013.01); *B60G 13/08* (2013.01); *B60G 17/08* (2013.01); *F16F 9/062* (2013.01); *F16F 9/065* (2013.01); *F16F 9/066* (2013.01); *F16F 9/3257* (2013.01); *F16F 9/364* (2013.01); *F16F 15/005* (2013.01); *F16F 15/023* (2013.01); *B60G 2202/24* (2013.01); *B60G 2202/42* (2013.01); *B60G 2206/41* (2013.01); *F16F 2222/12* (2013.01);
(Continued)

(58) Field of Classification Search
CPC ........ F16F 9/3207; F16F 9/3235; F16F 9/325; F16F 9/3257; F16F 9/346; F16F 9/36; F16F 9/362; F16F 9/364; F16F 9/185; F16F 9/464; F16F 9/062; F16F 9/064; F16F 9/065; F16F 9/066
See application file for complete search history.

(56) References Cited

U.S. PATENT DOCUMENTS 2,324,058 A * 7/1943 Boor ........................ F16F 9/34
                                                      137/493.8
2,432,937 A * 12/1947 Rossman ................ F16F 9/185
                                                        188/315

(Continued)

FOREIGN PATENT DOCUMENTS

EP       0261427 A2   3/1988
JP     2002257179 A   9/2002
(Continued)

*Primary Examiner* — Nicholas J Lane
(74) *Attorney, Agent, or Firm* — Harness, Dickey & Pierce, P.L.C.

(57) ABSTRACT

A shock absorber includes a pressure tube forming a working chamber. A reserve tube is concentric with and radially outward from the pressure tube. A baffle tube is positioned radially outward from the pressure tube. A reservoir chamber is formed between the reserve tube and the baffle tube. A piston is attached to a piston rod and slidably disposed within the pressure tube. A rod guide is attached to the pressure tube and supports the piston rod. An electromechanical valve is positioned within the rod guide. The baffle tube and the pressure tube form a fluid passage between the electromechanical valve and the reservoir chamber.

10 Claims, 6 Drawing Sheets

(51) Int. Cl.
  *F16F 15/00*    (2006.01)
  *F16F 15/023*   (2006.01)
  *B60G 13/08*    (2006.01)
  *B60G 17/08*    (2006.01)
  *F16F 9/36*     (2006.01)
  *F16F 9/06*     (2006.01)
  *F16F 9/32*     (2006.01)

(52) U.S. Cl.
  CPC ... *F16F 2228/066* (2013.01); *F16F 2230/183* (2013.01); *F16F 2232/08* (2013.01)

(56) References Cited

U.S. PATENT DOCUMENTS

| | | | |
|---|---|---|---|
| 4,971,180 A * | 11/1990 | Kobayashi | F16F 9/062 188/282.4 |
| 5,070,970 A * | 12/1991 | Johnston | F16F 9/185 188/315 |
| 5,113,980 A | 5/1992 | Furrer et al. | |
| 5,353,897 A * | 10/1994 | Woessner | F16F 9/512 188/267 |
| 5,353,898 A | 10/1994 | Handke et al. | |
| 5,449,055 A | 9/1995 | Geiling et al. | |
| 5,924,528 A | 7/1999 | Vermolen et al. | |
| 6,321,888 B1 | 11/2001 | Reybrouck et al. | |
| 6,913,127 B2 | 7/2005 | Holiviers et al. | |
| 8,434,772 B2 | 5/2013 | Keil et al. | |
| 8,616,351 B2 | 12/2013 | Roessle et al. | |
| 9,217,483 B2 | 12/2015 | Dunaway et al. | |
| 9,303,711 B2 | 4/2016 | Nakajima | |
| 9,404,551 B2 | 8/2016 | Roessle et al. | |
| 9,662,952 B2 | 5/2017 | Funke et al. | |
| 2005/0056504 A1 | 3/2005 | Holiviers | |
| 2007/0221459 A1 | 9/2007 | Kobelev et al. | |
| 2007/0278028 A1 | 12/2007 | Fought et al. | |
| 2009/0120749 A1 | 5/2009 | Kolz | |
| 2014/0238797 A1 | 8/2014 | Blankenship et al. | |
| 2014/0262652 A1 * | 9/2014 | Roessle | F16F 9/185 188/313 |
| 2016/0017950 A1 * | 1/2016 | Nakano | B60G 13/08 188/315 |
| 2016/0082803 A1 | 3/2016 | Dunaway et al. | |

FOREIGN PATENT DOCUMENTS

| | | |
|---|---|---|
| KR | 20100089490 A | 8/2010 |
| WO | WO-2016067733 A1 | 5/2016 |

* cited by examiner

BAFFLE TUBE FOR DAMPER WITH ELECTROMECHANICAL VALVE

FIELD

The present disclosure relates generally to hydraulic dampers or shock absorbers for use in a suspension system such as a suspension system used for automotive vehicles. More particularly, the present disclosure relates to a baffle tube for a damper including an electromechanical valve.

BACKGROUND

This section provides background information related to the present disclosure which is not necessarily prior art.

In general, conventional shock absorbers produce damping force characteristics based on a velocity of a piston rod that translates relative to a body of the shock absorber. The shock absorber includes a valve through which oil flows during movement of the piston rod. A pressure differential is generated within the shock absorber based on the configuration and location of the valve. The working pressures provide a resistive or damping force between the piston rod and the body of the shock absorber to provide a desired damping force characteristic of a vehicle's suspension.

Electronically adjustable shock absorbers are also available. These shock absorbers produce damping force characteristics as well but the damping force is adjustable over a damping force range. As such, electronically-adjustable shock absorbers may provide multiple damping force characteristic curves for the same piston rod velocity.

Both conventional and electronically-adjustable shock absorbers may exhibit a lower magnitude of damping force than desired if an insufficient oil fluid volume is present in the shock absorber reservoir chamber or if the fluid is aerated. Many shock absorbers are configured as twin tube shock absorbers where the reservoir contains both a liquid oil fluid and a pressurized gas within the same chamber. The oil fluid level within the reservoir changes during shock absorber operation but the shock absorber is configured to maintain a minimum oil level at all times. In certain shock absorbers, the physical position of the valves relative to the liquid level in the reservoir may induce a mixing of gas and liquid thereby aerating the liquid oil. A resultant lag of damping force occurs due to the compressibility of the gas within the liquid. It is at least one object of the present disclosure to mitigate aeration of the liquid within the shock absorber to minimize a lag in providing a target damping force.

SUMMARY

This section provides a general summary of the disclosure, and is not a comprehensive disclosure of its full scope or all of its features.

A shock absorber includes a pressure tube forming a working chamber. A reserve tube is concentric with and radially outward from the pressure tube. A baffle tube is positioned radially outward from the pressure tube. A reservoir chamber is formed between the reserve tube and the baffle tube. A piston is attached to a piston rod and slidably disposed within the pressure tube. A rod guide is attached to the pressure tube and supports the piston rod. An electromechanical valve is positioned within the rod guide. The baffle tube and the pressure tube form a fluid passage between the electromechanical valve and the reservoir chamber.

The present disclosure also describes a shock absorber including a piston assembly attached to a piston rod and slidably disposed within a pressure tube. The piston assembly divides a working chamber into an upper working chamber and a lower working chamber. The piston assembly includes a first valve assembly controlling fluid flowing through a first fluid passage that connects the upper working chamber with the lower working chamber. A reservoir tube is disposed around the pressure tube. A baffle tube is positioned radially outward from the pressure tube and at least partially defines a baffle tube channel between the pressure tube and the baffle tube. The reservoir chamber is positioned between the baffle tube and the reserve tube. A second valve is positioned within the pressure tube for controlling fluid flow between one of the upper and lower working chambers and the reservoir chamber. A rod guide supports the piston rod and is attached to an end of the pressure tube. A second fluid passage extends from one of the upper and lower working chambers to the baffle tube channel. An electromechanical valve is positioned within the rod guide for controlling fluid flow through the second passage. The baffle tube channel fluidly connects the electromechanical valve and the reservoir.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
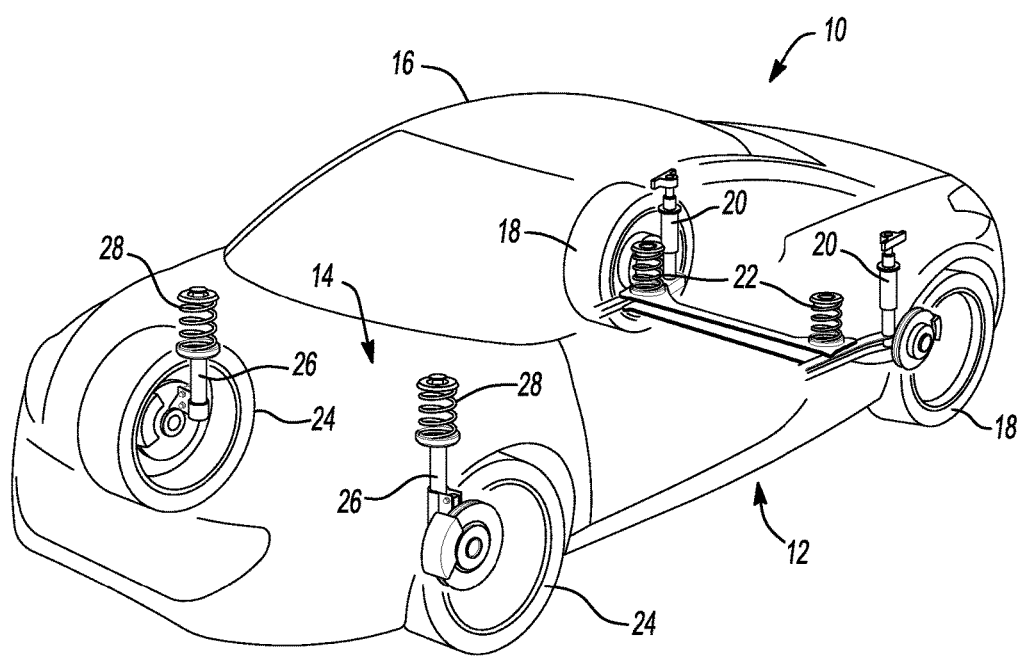
FIG. 1 is an illustration of an automobile having shock absorbers which incorporate the valve design in accordance with the present disclosure.

The following description is merely exemplary in nature and is not intended to limit the present disclosure, application, or uses. There is shown in FIG. 1 a vehicle incorporating a suspension system having shock absorbers, each of which incorporates a valve assembly in accordance with the present invention, and which is designated generally by the reference numeral 10. Vehicle 10 includes a rear suspension 12, a front suspension 14 and a body 16.

Rear suspension 12 has a transversely extending rear axle assembly (not shown) adapted to operatively support a pair of rear wheels 18. The rear axle is attached to body 16 by means of a pair of shock absorbers 20 and by a pair of springs 22. Similarly, front suspension 14 includes a transversely extending front axle assembly (not shown) to operatively support a pair of front wheels 24. The front axle assembly is attached to body 16 by means of a pair of shock absorbers 26 and by a pair of springs 28.

Shock absorbers 20 and 26 serve to dampen the relative motion of the unsprung portion (i.e., front and rear suspensions 12, 14) with respect to the sprung portion (i.e., body 16) of vehicle 10. While vehicle 10 has been depicted as a passenger car having front and rear axle assemblies, shock absorbers 20 and 26 may be used with other types of vehicles or in other types of applications including, but not limited to, vehicles incorporating non-independent front and/or non-independent rear suspensions, vehicles incorporating independent front and/or independent rear suspensions or other suspension systems known in the art. Further, the term "shock absorber" as used herein is meant to refer to dampers in general and thus will include McPherson struts and other damper designs known in the art.

Figure 2:
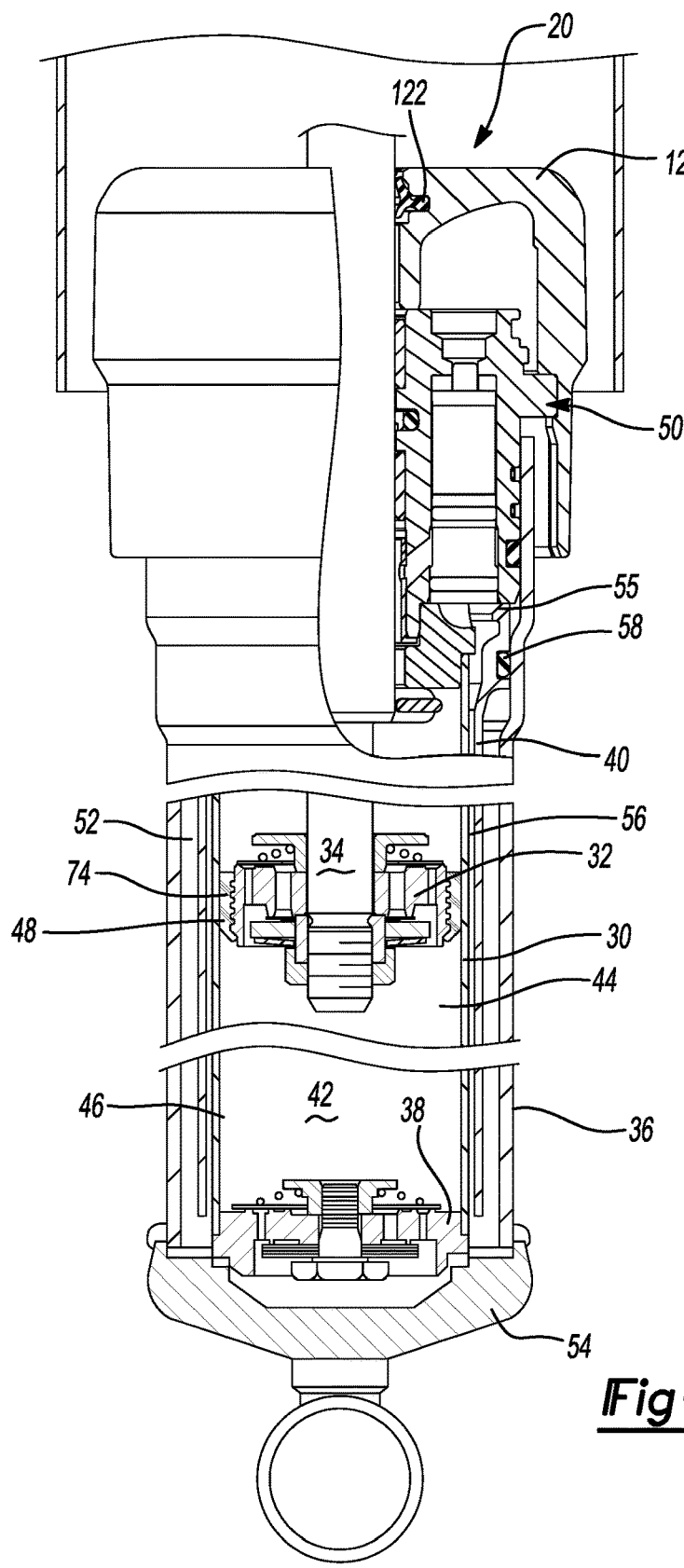
FIG. 2 is a side view, partially in cross-section of a dual-tube shock absorber from FIG. 1 which incorporates the valve design in accordance with the present disclosure.

Referring now to FIG. 2, shock absorber 20 is shown in greater detail. While FIG. 2 illustrates only shock absorber 20, it is to be understood that shock absorber 26 also includes the valve assembly design described below for shock absorber 20. Shock absorber 26 only differs from shock absorber 20 in the manner in which it is adapted to be connected to the sprung and unsprung masses of vehicle 10. Shock absorber 20 comprises a pressure tube 30, a piston assembly 32, a piston rod 34, a reserve tube 36, a base valve assembly 38 and a baffle tube 40.

Pressure tube 30 defines a working chamber 42. Piston assembly 32 is slidably disposed within pressure tube 30 and divides working chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through a rod guide assembly 50 which closes the upper end of pressure tube 30. The end of piston rod 34 opposite to piston assembly 32 is adapted to be secured to the sprung mass of vehicle 10. Valving within piston assembly 32 controls the movement of fluid between upper working chamber 44 and lower working chamber 46 during movement of piston assembly 32 within pressure tube 30. Because piston rod 34 extends only through upper working chamber 44 and not lower working chamber 46, movement of piston assembly 32 with respect to pressure tube 30 causes a difference in the amount of fluid displaced in upper working chamber 44 and the amount of fluid displaced in lower working chamber 46. The difference in the amount of fluid displaced is known as the "rod volume" and it flows through base valve assembly 38.

Reserve tube 36 surrounds pressure tube 30 to define a fluid reservoir chamber 52 located between tubes 30 and 36. The bottom end of reserve tube 36 is closed by a base cup 54 which is adapted to be connected to the unsprung mass of vehicle 10. The upper end of reserve tube 36 is attached to rod guide assembly 50. Base valve assembly 38 is disposed between lower working chamber 46 and reservoir chamber 52 to control the flow of fluid between chambers 46 and 52. When shock absorber 20 extends in length, an additional volume of fluid is needed in lower working chamber 46 due to the "rod volume" concept. Thus, fluid will flow from reservoir chamber 52 to lower working chamber 46 through base valve assembly 38 as detailed below. When shock absorber 20 compresses in length, an excess of fluid must be removed from lower working chamber 46 due to the "rod volume" concept. Thus, fluid will flow from lower working chamber 46 to reservoir chamber 52 through base valve assembly 38 as detailed below.

Baffle tube 40 extends concentrically between pressure tube 30 and reserve tube 36. An upper end of baffle tube 40 is attached to rod guide assembly 50. An attachment mechanism 55 may include a hook, a snap-fit, a press fit or another suitable arrangement. A lower distal end of baffle tube 40 is shown unsupported and spaced apart from pressure tube 30, reserve tube 36 and base valve assembly 38. Alternatively, a support structure may be connected to the lower distal end of the baffle tube. The lower distal end of baffle tube 40 extends into reservoir chamber 52 to such an extent to assure that the end maintains continuous contact with liquid fluid positioned within reservoir chamber 52. More particularly, a baffle tube channel 56 exists between an outer cylindrical surface of pressure tube 30 and an inner cylindrical surface of baffle tube 40. This annular space is completely filled with liquid at all times of operation of shock absorber 20.

A portion of reservoir chamber 52 positioned between an outer cylindrical surface of baffle tube 40 and an internal cylindrical surface of reserve tube 36 contains liquid fluid such as an oil in the lower region that at least includes the distal lower end of baffle tube 40. A pressurized gas is positioned within an upper portion of reservoir chamber 52. An o-ring 58 seals the upper end of baffle tube 40 to reserve tube 36. Other structures useful for providing sealing attachment including a press fit or a weld are contemplated as being within the scope of the present disclosure.

Figure 3:
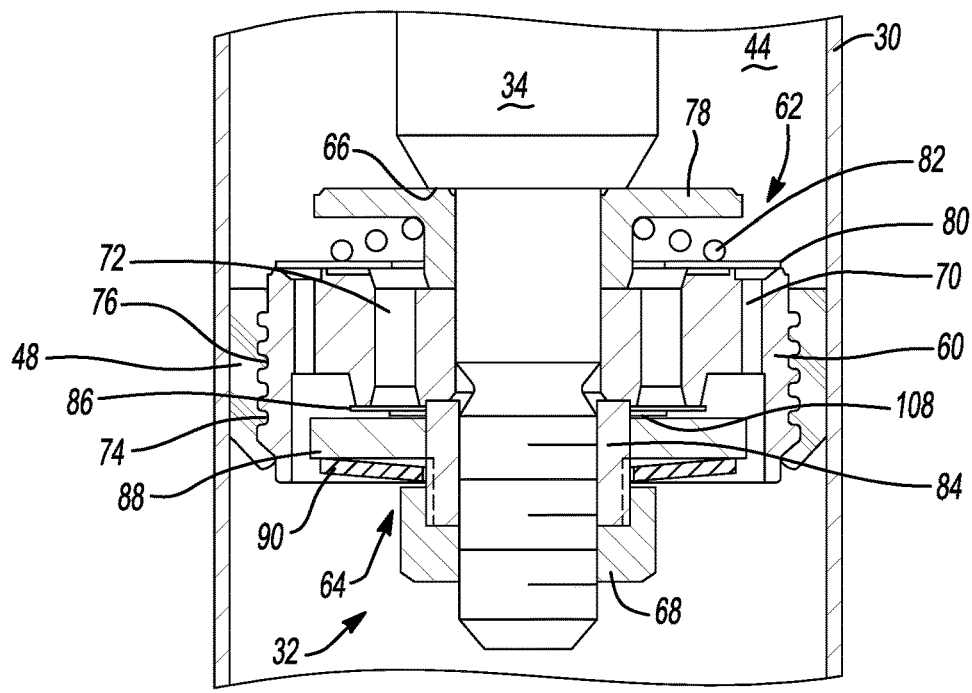
FIG. 3 is an enlarged side view, partially in cross-section, of the piston assembly from the shock absorber illustrated in FIG. 2.

Referring now to FIG. 3, piston assembly 32 comprises a piston body 60, a compression valve assembly 62 and a rebound valve assembly 64. Compression valve assembly 62 is assembled against a shoulder 66 on piston rod 34. Piston body 60 is assembled against compression valve assembly 62 and rebound valve assembly 64 is assembled against piston body 60. A nut 68 secures these components to piston rod 34.

Piston body 60 defines a plurality of compression passages 70 and a plurality of rebound passages 72. Seal 48 includes a plurality of ribs 74 which mate with a plurality of annular grooves 76 to retain seal 48 during sliding movement of piston assembly 32.

Compression valve assembly 62 comprises a retainer 78, a valve disc 80 and a spring 82. Retainer 78 abuts shoulder 66 on one end and piston body 60 on the other end. Valve disc 80 abuts piston body 60 and closes compression passages 70 while leaving rebound passages 72 open. Spring 82 is disposed between retainer 78 and valve disc 80 to bias valve disc 80 against piston body 60. During a compression stroke, fluid in lower working chamber 46 is pressurized causing fluid pressure to react against valve disc 80. When the fluid pressure against valve disc 80 overcomes the biasing load of spring 82, valve disc 80 separates from piston body 60 to open compression passages 70 and allow fluid flow from lower working chamber 46 to upper working chamber 44. Typically spring 82 only exerts a light load on valve disc 80 and compression valve assembly 62 acts as a check valve between chambers 46 and 44. The damping characteristics for shock absorber 20 during a compression stroke are controlled in part by base valve assembly 38 which accommodates the flow of fluid from lower working chamber 46 to reservoir chamber 52 due to the "rod volume" concept. During a rebound stroke, compression passages 70 are closed by valve disc 80.

Rebound valve assembly 64 is termed a passive valve assembly which comprises a spacer 84, a plurality of valve discs 86, a retainer 88 and a spring 90. Spacer 84 is threadingly received on piston rod 34 and is disposed between piston body 60 and nut 68. Spacer 84 retains piston body 60 and compression valve assembly 62 while permitting the tightening of nut 68 without compressing either valve disc 80 or valve discs 86. Retainer 78, piston body 60 and spacer 84 provide a continuous solid connection between shoulder 66 and nut 68 to facilitate the tightening and securing of nut 68 to spacer 84 and thus to piston rod 34. Valve discs 86 are slidingly received on spacer 84 and abut piston body 60 to close rebound passages 72 while leaving compression passages 70 open. Retainer 88 is also slidingly received on spacer 84 and it abuts valve discs 86. Spring 90 is assembled over spacer 84 and is disposed between retainer 88 and nut 68 which is threadingly received on spacer 84. Spring 90 biases retainer 88 against valve discs 86 and valve discs 86 against piston body 60. When fluid pressure is applied to valve discs 86, they will elastically deflect at the outer peripheral edge to open rebound valve assembly 64. A shim is located between nut 68 and spring 90 to control the preload for spring 90 and thus the blow off pressure as described below. Thus, the calibration for the blow off feature of rebound valve assembly 64 is separate from the calibration for compression valve assembly 62.

During a rebound stroke, fluid in upper working chamber 44 is pressurized causing fluid pressure to react against valve discs 86. Prior to the deflecting of valve discs 86, a bleed flow of fluid flows through a bleed passage defined between valve discs 86 and piston body 60. When the fluid pressure reacting against valve discs 86 overcomes the bending load for valve discs 86, valve discs 86 elastically deflect opening rebound passages 72 allowing fluid flow from upper working chamber 44 to lower working chamber 46. The strength of valve discs 86 and the size of rebound passages will determine the damping characteristics for shock absorber 20 in rebound. When the fluid pressure within upper working chamber 44 reaches a predetermined level, the fluid pressure will overcome the biasing load of spring 90 causing axial movement of retainer 88 and the plurality of valve discs 86. The axial movement of retainer 88 and valve discs 86 fully opens rebound passages 72 thus allowing the passage of a significant amount of damping fluid creating a blowing off of the fluid pressure which is required to prevent damage to shock absorber 20 and/or vehicle 10.

Figure 4:
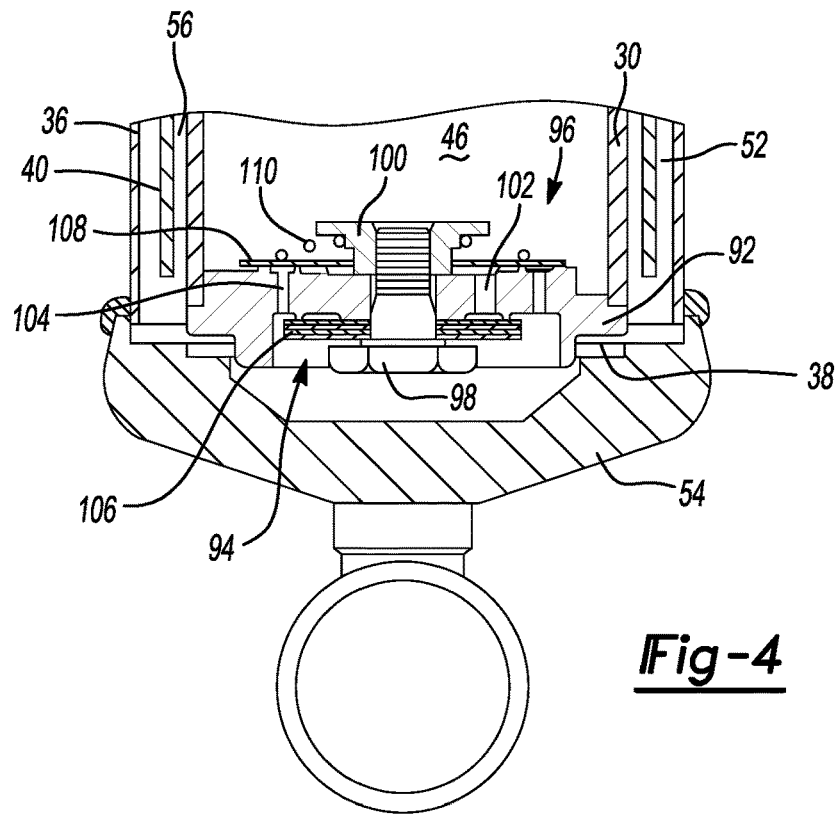
FIG. 4 is an enlarged side view, partially in cross-section of the base valve assembly from the shock absorber illustrated in FIG. 2.

Referring to FIG. 4, base valve assembly 38 comprises a valve body 92, a compression valve assembly 94 and a rebound valve assembly 96. Compression valve assembly 94 and rebound valve assembly 96 are attached to valve body 92 using a bolt 98 and a nut 100. The tightening of nut 100 biases compression valve assembly 94 towards valve body 92. Valve body 92 defines a plurality of compression passages 102 and a plurality of rebound passages 104.

Compression valve assembly 94 is termed a passive valve assembly which comprises a plurality of valve discs 106 that are biased against valve body 92 by bolt 98 and nut 100. During a compression stroke, fluid in lower working chamber 46 is pressurized and the fluid pressure within compression passages 102 reacts against valve discs 106. Prior to the deflection of valve discs 106, a bleed flow of fluid will flow through a bleed passage defined between valve discs 106 and valve body 92. The fluid pressure reacting against valve discs 106 will eventually open compression valve assembly 94 by deflecting valve discs 106 in a manner similar to that described above for rebound valve assembly 64. Compression valve assembly 62 will allow fluid flow from lower working chamber 46 to upper working chamber 44 and only the "rod volume" will flow through compression valve assembly 94. The damping characteristics for shock absorber 20 are determined in part by the design of compression valve assembly 94 of base valve assembly 38.

Rebound valve assembly 96 comprises a valve disc 108 and a valve spring 110. Valve disc 108 abuts valve body 92 and closes rebound passages 104. Valve spring 110 is disposed between nut 100 and valve disc 80 to bias valve disc 108 against valve body 92. During a rebound stroke, fluid in lower working chamber 46 is reduced in pressure causing fluid pressure in reservoir chamber 52 to react against valve disc 108. When the fluid pressure against valve disc 108 overcomes the biasing load of valve spring 110, valve disc 108 separates from valve body 92 to open rebound passages 104 and allow fluid flow from reservoir chamber 52 to lower working chamber 46. Typically valve spring 110 exerts only a light load on valve disc 108 and compression valve assembly 94 acts as a check valve between reservoir chamber 52 and lower working chamber 46. The damping characteristics for a rebound stroke are controlled in part by rebound valve assembly 64 as detailed above.

Figure 5:
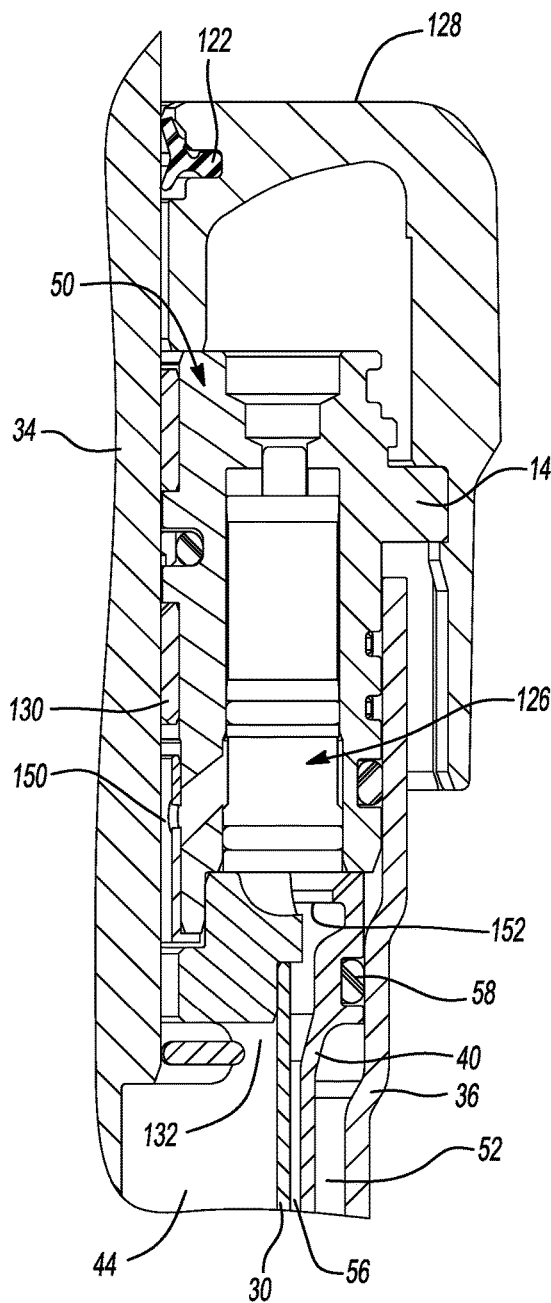
FIG. 5 is an enlarged side view, partially in cross-section of the electromechanical valve assembly from the shock absorber illustrated in FIG. 2.
Figure 6:
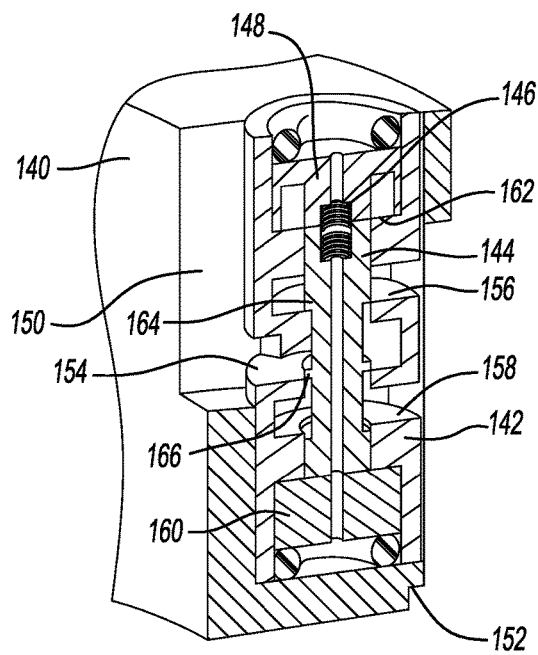
FIG. 6 is an enlarged cross-sectional perspective view of the electromechanical valve assembly illustrated in FIGS. 2 and 5.

Referring now to FIGS. 5 and 6, rod guide assembly 50 is illustrated in greater detail. Rod guide assembly 50 comprises a rod guide housing 120, a seal assembly 122, and an electromechanical valve assembly 126.

Rod guide housing 120 is assembled into pressure tube 30 and into reserve tube 36. Seal assembly 122 is assembled to rod guide housing 120. A cap 128 is attached to the end of shock absorber 20. A bushing 130 assembled into rod guide housing 120 accommodates for the sliding motion of piston rod 34 while also providing for a seal for piston rod 34. A fluid passage 132 extends through rod guide housing 120 to allow fluid communication between upper working chamber 44 and electromechanical valve assembly 126 as discussed below.

Electromechanical valve assembly 126 is a two position valve assembly which has a different flow area in each of the two positions. Electromechanical valve assembly 126 comprises a valve housing 140, a sleeve 142, a spool 144, a spring 146 and a coil assembly 148. It should be appreciated that valve housing 140 may be integral to rod guide 120. Valve housing 140 defines a valve inlet 150 which is in communication with upper working chamber 44 through fluid passage 132 and a valve outlet 152 which is in fluid communication with baffle tube passage 56. While this embodiment and other embodiments described later include spring 146 in the electromechanical valve assemblies, it is within the scope of the present disclosure to use electromechanical valve assemblies that do not include spring 146. Electromechanical valve assemblies that do not include spring 146 are moved between their two positions by reversing the current or reversing the polarity of the power provided to the electromechanical valve assembly. It is also contemplated that other electromechanical valves may be implemented into the shock absorber of the present disclosure. For example, a suitable alternative valve may include a side inlet and a bottom outlet.

Sleeve 142 is disposed within valve housing 140. Sleeve 142 defines an annular inlet chamber 154 which is in communication with valve inlet 150 and a pair of annular outlet chambers 156 and 158 which are in communication with valve outlet 152. It should be appreciated that alternate configurations having only one outlet are within the scope of the present disclosure. The outlet(s) may be directed axially instead of the radial orientation depicted.

Spool 144 is slidingly received within sleeve 142 and axially travels within sleeve 142 between coil assembly 148 and a stop puck 160 disposed within sleeve 142. Spring 146 biases spool 144 away from coil assembly 148 and towards stop puck 160. A shim 162 is disposed between coil assembly 148 and sleeve 142 to control the amount of axial motion for spool 144. A first O-ring seals the interface between stop puck 160, sleeve 142 and valve housing 140. A second O-ring seals the interface between coil assembly 148, sleeve 142 and rod guide housing 120.

Spool 144 defines a first flange 164 which controls fluid flow between annular inlet chamber 154 and annular outlet chamber 156 and a second flange 166 that controls fluid flow between annular inlet chamber 154 and annular outlet chamber 158. Flanges 164 and 166 thus control fluid flow from upper working chamber 44 to reservoir chamber 52. The number of flanges depends on the configuration of the outlet. One or more flanges may be used.

Coil assembly 148 is disposed within sleeve 142 to control the axial movement of spool 144. The wiring connections for coil assembly 148 can extend through rod guide housing 120, through sleeve 142, through valve housing 140 and/or through reserve tube 36. When there is no power provided to coil assembly 148, the damping characteristics will be defined by the flow area of electromechanical valve assembly 126 in its first position, piston assembly 32 and base valve assembly 38. The movement of spool 144 is controlled by supplying power to coil assembly 148 to move electromechanical valve assembly to its second position. Electromechanical valve assembly 126 can be kept in its second position by continuing to supply power to coil assembly 148 or by providing means for retaining electromechanical valve assembly 126 in its second position and discontinuing the supply of power to coil assembly 148. The means for retaining electromechanical valve assembly 126 in its second position can include mechanical means, magnetic means or other means known in the art. Once in its second position, movement to the first position can be accomplished by terminating power to coil assembly 148 or by reversing the current or reversing the polarity of the power supplied to coil assembly 148 to overcome the retaining means. The amount of flow through electromechanical valve assembly 126 has discrete settings for flow control in both the first position and the second position.

While the present disclosure is described using only one electromechanical valve assembly 126, it is within the scope of the disclosure to use a plurality of electromechanical valve assemblies 126. When multiple electromechanical valve assemblies 126 are used, the total flow area through the plurality of electromechanical valve assemblies 126 can be set at a specific number of total flow areas depending on the position of each individual electromechanical valve assemblies 126. The specific number of total flow areas can be defined as being $2^n$ flow areas where n is the number of electromechanical valve assemblies 126. For example, if four electromechanical valve assemblies 126, the number of total flow areas available would be $2^4$ or sixteen flow areas.

Figure 7:
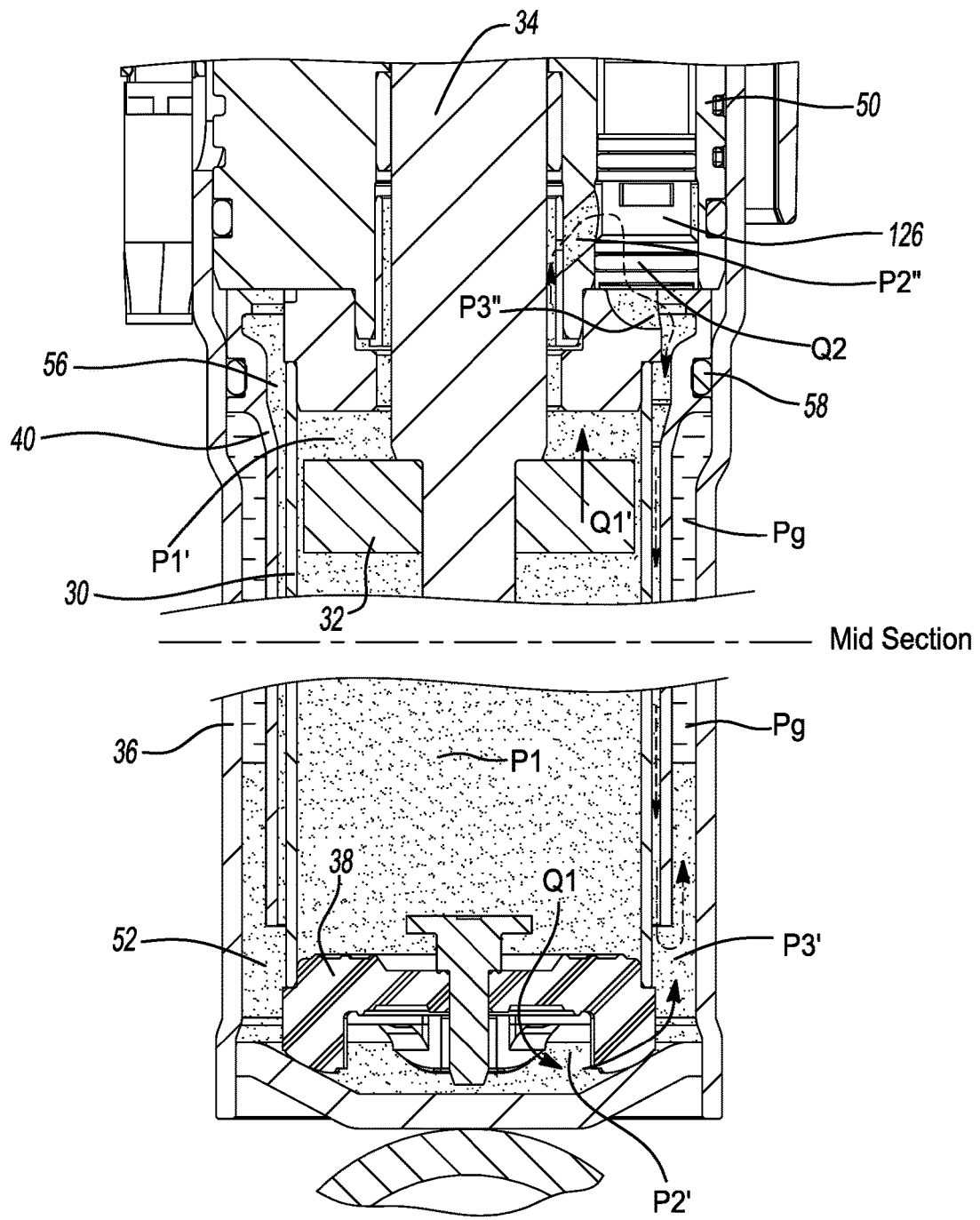
FIG. 7 is an enlarged cross-sectional view of the dual-tube shock absorber illustrating fluid pressures and flows during a compression stroke.

Referring to FIG. 7, the working principles of shock absorber 20 during a compression stroke are depicted. A compression stroke includes advancing piston rod 34 into pressure tube 30. As piston rod 34 is translated, it enters pressure tube 30 and displaces a volume of oil equal to the rod volume. A primary oil flow Q1 passes through the restrictions in base valve assembly 38. At the same time, an annular volume Q1' flows in an unrestricted manner through compression valve assembly 62 to replenish the volume of oil within upper working chamber 44. If one or more of electromechanical valve assemblies 126 are in an OPEN state, then a secondary oil flow Q2 occurs in parallel with the primary oil flow Q1. The secondary oil flow(s) Q2 are restricted by orifice areas associated with each of electromechanical valve assemblies 126.

As a result of the flows Q1 and Q2, a high pressure P1 occurs within lower working chamber 46 of pressure tube 30 between base valve assembly 38 and piston assembly 32. A lower pressure P2' occurs below the base valve assembly 38 due to the pressure differential (P1>P2'). A lower pressure occurs above the piston assembly 32 due to the pressure differential (P1>P1'). Likewise, a lower pressure P2" occurs after the orifice restrictions associated with each electromechanical valve assembly 126 due to the pressure differential (P1'>P2"). Additional pressure differentials may be associated with each electromechanical valve assembly 126 if there are any internal flow restrictions within the electromechanical valve assemblies 126. In which case, a lower pressure P3" occurs after electromechanical valve assemblies 126 due to the pressure differential (P2">P3").

The secondary oil flow Q2 continues within baffle tube channel 56 and rejoins the primary oil flow Q1 in reservoir chamber 52 in order for Qtotal=(Q1+Q2). A pressure P3' at the bottom of baffle tube 40 and after base valve assembly 38 will be equal to the gas charge pressure Pg in reservoir chamber 52 (i.e., P3">P3'=Pg).

Figure 8:
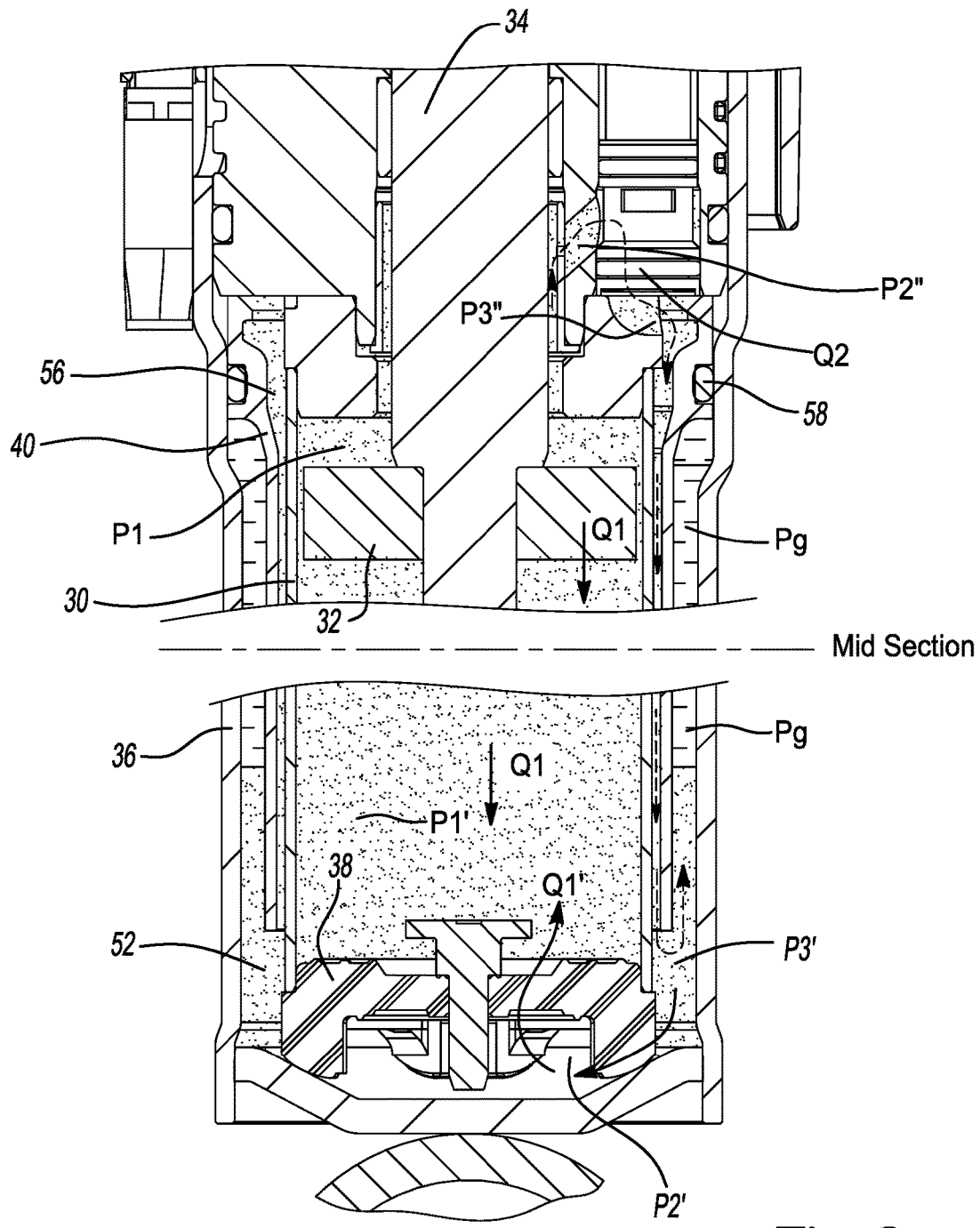
FIG. 8 is an enlarged cross-sectional view of the dual-tube shock absorber illustrating fluid pressures and flows during a rebound stroke.

Referring to FIG. 8, during a rebound stroke (or extension stroke) of the shock absorber, piston rod 34 exits from pressure tube 30 and displaces a volume of oil equal to the rod volume. The primary oil flow Q1 passes through the restrictions in piston assembly 32. At the same time, rod volume Q1' flows unrestricted through base valve assembly 38 to replenish the volume of oil within the lower portion of pressure tube 30 between piston assembly 32 and base valve assembly 38. If one or more electromechanical valve assemblies 126 are in OPEN state, then a secondary oil flow Q2 occurs in parallel with the primary oil flow Q1. The secondary oil flow(s) Q2 are restricted by orifice areas associated with each of the electromechanical valve assemblies 126.

As a result of the flows Q1 and Q2, high pressure P1 occurs within the working chamber of pressure tube 30 between piston assembly 32 and rod guide assembly 50. A lower pressure P1' occurs below piston assembly 32 due to the pressure differential (P1>P1') and (P2'>P1'). Likewise, a lower pressure P2" occurs after the orifice restrictions associated with each electromechanical valve assembly 126 due to the pressure differential (P1>P2"). There may be additional pressure differentials associated with each electromechanical valve assembly 126 if there are any internal flow restrictions within electromechanical valve assemblies 126. In which case, a lower pressure P3" occurs after electromechanical valve assemblies 126 due to the pressure differential (P2">P3").

The secondary oil flow Q2 continues within the baffle tube channel 56 and rejoins the primary oil flow Q1 in the reservoir chamber 52 in order for Qtotal=(Q1+Q2). The pressure P3' at the bottom of baffle tube 40 and after base valve assembly 38 will be equal to the gas charge pressure Pg in the reservoir chamber 52 (i.e., P3">P3'=Pg).

Since baffle tube 40 is sealed at the upper end by o-ring 58 or another sealing method, the pressure at the upper end of baffle tube 40 is always higher than the pressure at the lower end of baffle tube 40 within reservoir chamber 52 (i.e., P3">P3'=Pg). The oil level within reservoir chamber 52 is defined to always remain above the lower end of baffle tube 40 during total stroke of the shock absorber from extension to compression. As a result, baffle tube 40 mitigates the risk for aeration or lag in damping force since P1>P2">P3">P3'=Pg and Qtotal=(Q1+Q2).

While not shown here with an illustration, another embodiment of the disclosure includes individual baffle tubes for each electromechanical valve assembly 126. This embodiment would function in the same manner as described previously. The only difference is packaging of the baffle tubes. The individual baffle tubes would have a defined diameter to allow sufficient oil flow rate Q2 (for example, 8 mm inside diameter). Each baffle tube would be sealed at the outlet of each electromechanical valve assembly 126 using an elastomeric seal, press fit, weld, or other means known in the art. Similarly, the oil level within the reservoir chamber 52 would be defined to always remain above the lower end of the baffle tubes during total stroke of the shock absorber from extension to compression. As a result, the baffle tubes will mitigate the risk for aeration or lag in damping force since P1>P2">P3">P3'=Pg and Qtotal=(Q1+Q2).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A shock absorber comprising:
   a pressure tube forming a working chamber;
   a piston assembly attached to a piston rod and slidably disposed within the pressure tube, the piston assembly dividing the working chamber into an upper working chamber and a lower working chamber, the piston assembly including a first valve assembly controlling fluid flowing through a first fluid passage that connects the upper working chamber with the lower working chamber;
   a reserve tube disposed around the pressure tube;
   a baffle tube positioned radially outward from the pressure tube and at least partially defining a baffle tube channel between the pressure tube and the baffle tube;
   a reservoir chamber positioned between the baffle tube and the reserve tube;
   a second valve positioned within the pressure tube for controlling fluid flow between one of the upper and lower working chambers and the reservoir chamber;
   a rod guide supporting the piston rod and being attached to an end of the pressure tube;
   a second fluid passage separate from the first fluid passage, the second fluid passage extending from one of the upper and lower working chambers to the baffle tube channel; and
   an electromechanical valve positioned within the rod guide for controlling fluid flow through the second passage, wherein the baffle tube channel fluidly connects the electromechanical valve and the reservoir, wherein the baffle tube includes a first end sealingly attached to the reserve tube and a second opposite end spaced apart from each of the pressure tube, the reserve tube and the rod guide.

2. The shock absorber of claim 1, wherein liquid completely fills the working chamber and the baffle tube channel, the liquid partially filling the reservoir channel.

3. The shock absorber of claim 2, wherein the second end of the baffle tube remains submerged in the fluid.

4. The shock absorber of claim 1, wherein during a rebound or compression stroke of the piston rod a pressure within the upper working chamber is greater than a pressure at an inlet to the electromechanical valve which is greater than a pressure at an outlet of the electromechanical valve which is greater than a pressure at the second end of the baffle tube.

5. A shock absorber comprising:
   a pressure tube forming a working chamber;
   a reserve tube concentric with and radially outward from the pressure tube;
   a baffle tube positioned radially outward from the pressure tube;
   a reservoir chamber formed between the reserve tube and the baffle tube;
   a piston attached to a piston rod and slidably disposed within the pressure tube;
   a rod guide attached to the pressure tube and supporting the piston rod; and
   one or more electromechanical valves, wherein the baffle tube and the pressure tube form a fluid passage between the one or more electromechanical valves and the reservoir chamber, wherein the baffle tube includes a first end sealingly attached to the reserve tube and a second opposite end spaced apart from each of the pressure tube, reserve tube and rod guide.

6. The shock absorber of claim 5, wherein liquid completely fills the working chamber and the fluid passage, the liquid partially filling the reservoir channel.

7. The shock absorber of claim 6, wherein the second end of the baffle tube remains submerged in the fluid.

8. The shock absorber of claim 5, wherein the baffle tube is sealingly attached to the reserve tube via one of an elastomeric member, an adhesive, an interference fit or a weld.

9. The shock absorber of claim 5, wherein the piston includes a valve operable to provide a fluid passage through the piston.

10. The shock absorber of claim 5, wherein the baffle tube includes an uninterrupted wall extending from the first end to its second opposite end.

* * * * *